(12) United States Patent
Zimmer et al.

(10) Patent No.: US 7,048,877 B2
(45) Date of Patent: May 23, 2006

(54) EFFICIENTLY SUPPORTING INTERRUPTS

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 213 days.

(21) Appl. No.: 10/816,078

(22) Filed: Mar. 30, 2004

(65) Prior Publication Data

US 2005/0228923 A1      Oct. 13, 2005

(51) Int. Cl.
  *G06F 13/24*     (2006.01)
(52) U.S. Cl. ...................................... 260/260; 710/269
(58) Field of Classification Search ......... 710/260–269
  See application file for complete search history.

(56) References Cited

OTHER PUBLICATIONS

MICROSOFT, "The Importance of Implementing APIC-Based Interrupt Subsystems on Uniprocessor PCs", Jan. 7, 2003.

MICROSOFT, "Interrupt Architecture Enhancements in Microsoft Windows, Codenamed "Longhorn"", Windows Platform Design Notes, 2003.

*Primary Examiner*—Rehana Perveen
*Assistant Examiner*—Brian Misiura
(74) *Attorney, Agent, or Firm*—Blakely. Sokoloff, Taylor & Zafman LLP (57) ABSTRACT

A method, system, and article of manufacture to efficiently support interrupts of a computer system. A message-based interrupt from a device of the computer system is intercepted. A fake line-based interrupt for the device corresponding to the message-based interrupt is determined, wherein an operating system (OS) of the computer system is not message-based interrupt capable. The fake line-based interrupt is issued to the OS. A query from the OS regarding the fake line-based interrupt is serviced, the query to determine if the fake line-based interrupt was from the device. An interrupt vector associated with the message-based interrupt is provided to the OS.

28 Claims, 9 Drawing Sheets

EFFICIENTLY SUPPORTING INTERRUPTS

BACKGROUND

1. Field of Invention

The field of invention relates generally to computer systems and, more specifically but not exclusively, relates to efficiently supporting interrupts.

2. Background Information

Interrupts are used by devices of a computer system to gain the attention of a processor. Line-based interrupts, also known as Interrupt Request Lines (IRQs), involve dedicated circuit lines between devices, a controller, and the processor. Most personal computers (PCs) today have 15 IRQs available. A system employing an Input/Output Advanced Programmable Interrupt Controller (I/O APIC) may have 24 IRQs available.

The interrupt controller signals the processor that a device wants the processor's attention. The processor saves the memory address of the current operation in a stack and then responds to the interrupt. An interrupt vector corresponding to the interrupt is retrieved from an interrupt table. The interrupt vector points to a location in memory containing code for responding to the interrupt. This code is often referred to as an interrupt handler. The processor executes the interrupt handler. The time between the initial interrupt from the hardware device to the start of execution of the interrupt handler code is often referred to as interrupt latency. After completion of the interrupt handler, the processor retrieves the memory address from the stack and continues processing the interrupted instructions.

In today's computer systems, multiple devices often share the same interrupt line. For example, Peripheral Component Interconnect (PCI) interrupts are typically shared among four interrupt lines. The sharing of interrupts engenders a system where many device drivers must respond to an interrupt to determine which device actually sent the interrupt. This probing of devices wastes processor time and uses time expensive I/O bus transactions. Further, receiving interrupts from different devices simultaneously on a shared interrupt line can result in extended interrupt latency and even a hung machine.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments to efficiently support interrupts are described herein. In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the present invention may employ a firmware environment known as the Extensible Firmware Interface (EFI) (*Extensible Firmware Interface Specification*, Version 1.10, Dec. 1, 2002, available at http://developer.intel.com/technology/efi.) EFI is a public industry specification that describes an abstract programmatic interface between platform firmware and operating systems or other application environments. EFI enables firmware, in the form of firmware modules and drivers, to be loaded from a variety of different resources, including flash memory devices, option ROMs (Read-Only Memory), various persistent storage devices (e.g., hard disks, CD-ROM (Compact Disk-Read Only Memory), etc.), or from one or more computer systems over a computer network.

Message-based interrupts provide an alternative to traditional line-based interrupts. A message-based interrupt provides a flexible interrupt system and does not suffer the limitations of line-based interrupts. To generate an interrupt, a device delivers a message to a specific memory address. The OS uses the message to direct the device driver to handle the I/O. The deliver of the message by the device generates an interrupt. Since message-based interrupts are not tied to specific interrupt circuit lines, devices do not need to share interrupt lines.

An embodiment of message-based interrupt system includes message-signaled interrupts (MSIs). MSI is described in *PCI Local Bus Specification* 2.2 and *PCI Local Bus Specification PCI* 3.0 available at www.pcisig.com. While embodiments herein are described in relation to MSI, it will be understood that embodiments of the present invention are not limited to MSI.

The same device may be able to send different messages in MSI. The payload of an MSI may indicate to the device driver the nature of the interrupt. This ability reduces interrupt latency. For example, an MSI from a storage device may indicate a read event, a write event, an error, etc. This reduces the number of accesses required under traditional line-based interrupts that only signal that the device needs service but do not specify the nature of the service. Because no acknowledgement of the message is made, an MSI is considered an edge-triggered interrupt.

MSI devices may also be able to request a sub-driver associated with a master-driver for a device. Again, this enables the device to communicate the nature of the interrupt in the initial interrupt communication. In multiple processor systems, the MSI may use the message payload to indicate which processor is to handle the interrupt.

The number of available MSIs is only limited to the number of Interrupt Dispatch Table (IDT) entries that are available on a system. Thus, devices in an MSI capable system most likely do not have to share interrupts. In one embodiment, an IDT may have 96 entries or more.

Embodiments described herein enable a system to use MSI to avoid sharing interrupts even though the operating system is not MSI capable. In order for a system to take advantage of MSI, the device hardware and the operating system must be MSI capable. Further, device drivers of the operating system must be designed to use MSI. It will be understood that even if a hardware vendor provides an MSI-capable device driver, MSI cannot be utilized unless the system OS is also MSI capable.

Figure 1:
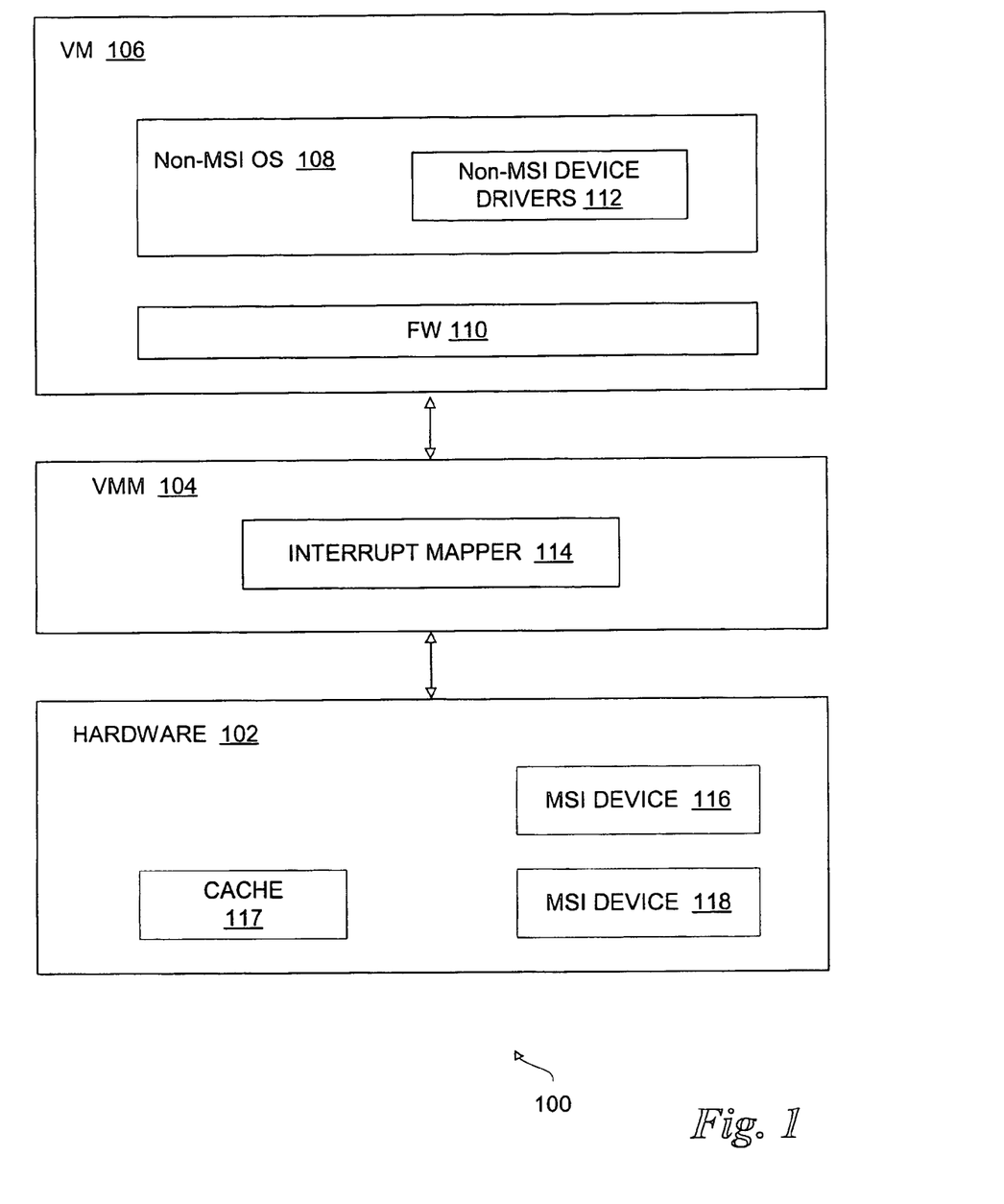
FIG. 1 is a block diagram illustrating one embodiment of a computer system in accordance with the teachings of the present invention.

Referring to FIG. 1, one embodiment of a computer system 100 is shown. Computer system 100 includes a Virtual Machine (VM) 106 layered on top of a Virtual Machine Monitor (VMM) 104. The VMM is layered on top of the platform hardware 102. While FIG. 1 shows one VM 106, computer system 100 may include multiple VMs layered on VMM 104 (discussed further below). In one embodiment, computer system 100 employs Intel Vanderpool Technology (VT).

A VM behaves like a complete physical machine that can run its own OS. Usually, each VM session is given the illusion by the VMM that it is the only physical machine. The VMM takes control whenever a VM attempts to perform an operation that may affect the whole computer system 100. Each VM supports a corresponding OS and firmware. Multiple VM sessions are separate entities and usually isolated from each other by the VMM. If one OS crashes or otherwise becomes unstable, the other OS's should not be adversely affected.

VM 106 includes a Non-MSI capable operating system (OS) 108 and firmware 110. Non-MSI OS 108 includes Non-MSI device drivers 112. Drivers 112 correspond to MSI devices 116 and 118. Firmware 110 emulates the firmware of the computer system 100 to support VM 106. Non-MSI OS 108 is not MSI capable and believes it is on a system using line-based interrupts.

VMM 104 includes an interrupt mapper 114. In one embodiment, interrupt mapper 114 is loaded from non-volatile storage, such as a flash memory device. Virus scanner 114 operates from the firmware environment of the computer system 100 and is independent of an operating system. In one embodiment, VMM 104 and interrupt mapper 114 operate substantially in compliance with the EFI specification.

Hardware 102 includes MSI-capable devices 116 and 118. Hardware 102 also includes a cache 117 to store configuration information of devices 116 and 118. As discussed below, device configuration information is used by VMM 104 in responding to queries from non-MSI device drivers 112. It will be understood that computer system 100 may include additional devices, but only two are shown in FIG. 1 for the sake of clarity.

Figure 2:
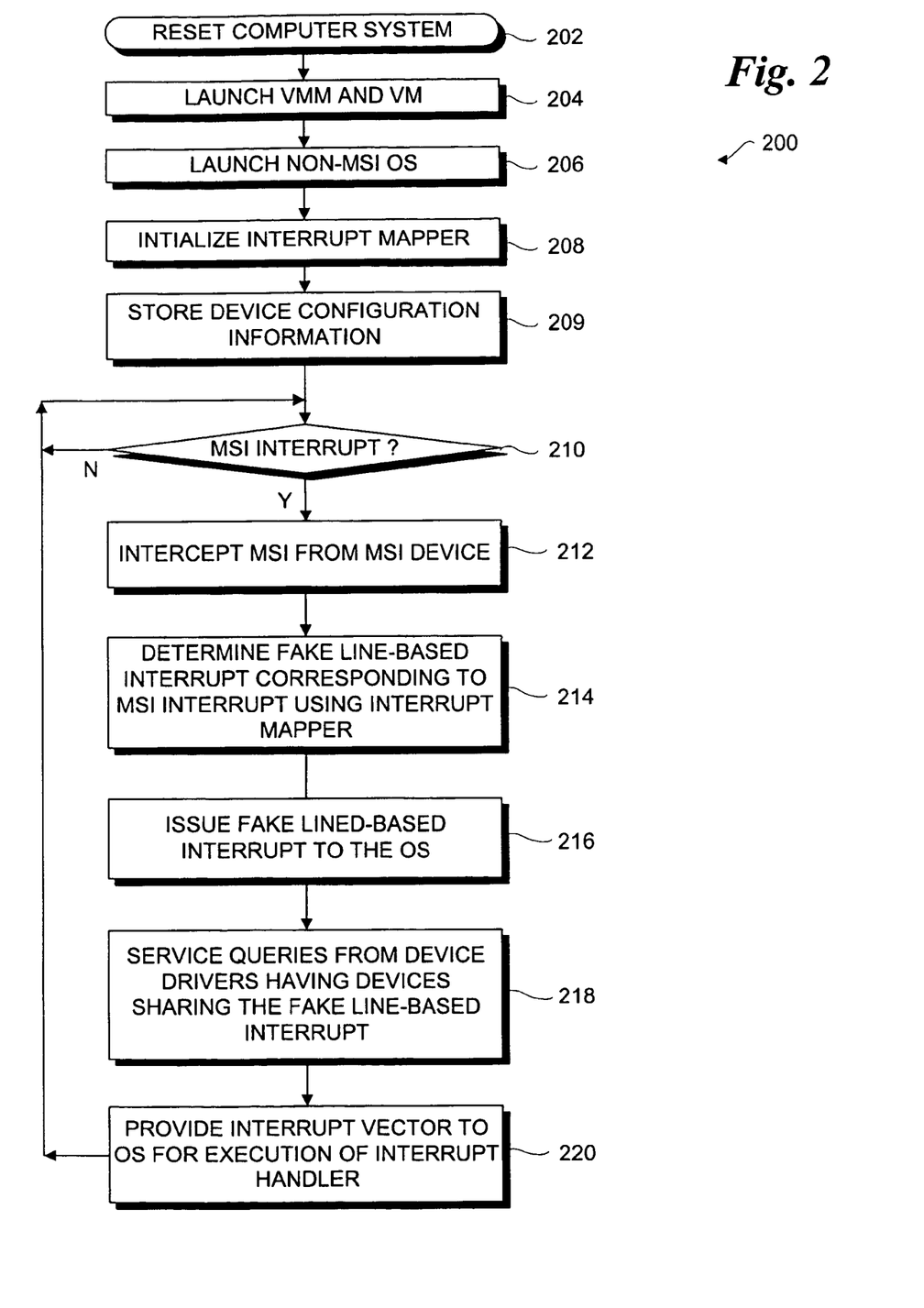
FIG. 2 is a flowchart illustrating one embodiment of the logic and operations to efficiently support interrupts in accordance with the teachings of the present invention.

Referring to FIG. 2, a flowchart 200 illustrates an embodiment of the present invention to efficiently support interrupts of a computer system. Starting in a block 202, the computer system is reset. Boot instructions stored in the computer system firmware are loaded and executed. In one embodiment, the system boot instructions will begin initializing the platform by conducting a Power-On Self-Test (POST) routine. Continuing to a block 204, the VMM 104 and the VM 106 are launched. In a block 206, the Non-MSI OS 108 is launched in VM 106.

Proceeding to a block 208, the interrupt mapper 114 is initialized. In one embodiment, VMM 104 initializes and manages interrupt mapper 114. VMM 104 analyzes the OS's view of line-based interrupts and integrates this into the interrupt mapper 114. VMM 104 has an omniscient view of system 100 that enables VMM 104 to manipulate the system's interrupt scheme. The interrupt mapper 114 is used to map MSIs sent by MSI devices to line-based interrupts for the non-MSI OS.

Continuing to a block 209, VMM 104 gathers and stores configuration information for MSI devices 116 and 118 in cache 117. In one embodiment, the cached configuration information includes data from a PCI configuration header.

Figure 3A:
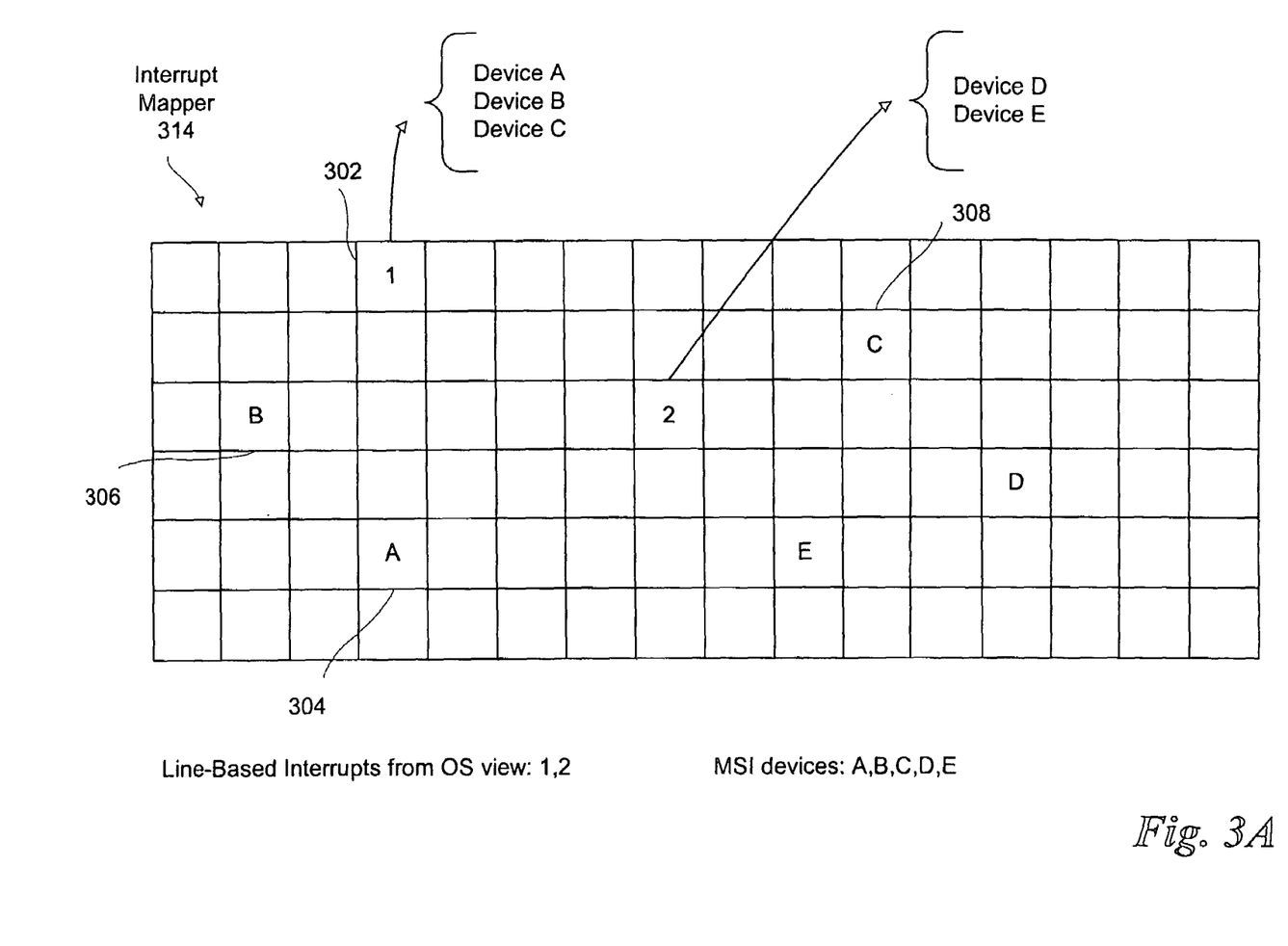
FIG. 3A is a block diagram illustrating one embodiment of an interrupt mapper in accordance with the teachings of the present invention.

Referring to FIG. 3A, an interrupt mapper 314 according to one embodiment of the present invention is shown. In one embodiment, interrupt mapper 314 is a table data structure. In another embodiment, the interrupt mapper 114 serves as the Interrupt Descriptor Table (IDT) for the computer system. The entries in the table correspond to interrupt vectors that point to interrupt handlers in memory. In yet another embodiment, each VM has a "virtual" IDT for its view of the platform. However, the VMM maintains the true IDT for the system. The VMM interacts with the VM as needed so that each VM believes its virtual IDT is the only IDT of the computer system.

In FIG. 3A, the interrupts from the OS point of view are shown by numbers, while interrupts from the MSI devices' point of view are shown by letters. As shown at 302, the OS believes line-interrupt 1 is shared be devices A, B, and C. In actuality, devices A, B, and C are MSI capable devices that do not share an interrupt line. Mapper 314 also includes the interrupt vectors for devices A, B, and C, shown at 304, 306, and 308 respectively.

Referring again to FIG. 2, the logic proceeds to a decision block 210 to determine if an MSI interrupt has occurred. If the answer to decision block 210 is no, the logic loops back to determine again if an interrupt has occurred.

If the answer to decision block 210 is yes, then the logic proceeds to a block 212. In block 212, the VMM intercepts the MSI from the MSI device. Continuing to a block 214, the logic determines the fake line-based interrupt corresponding to the MSI using the interrupt mapper.

Figure 3B:
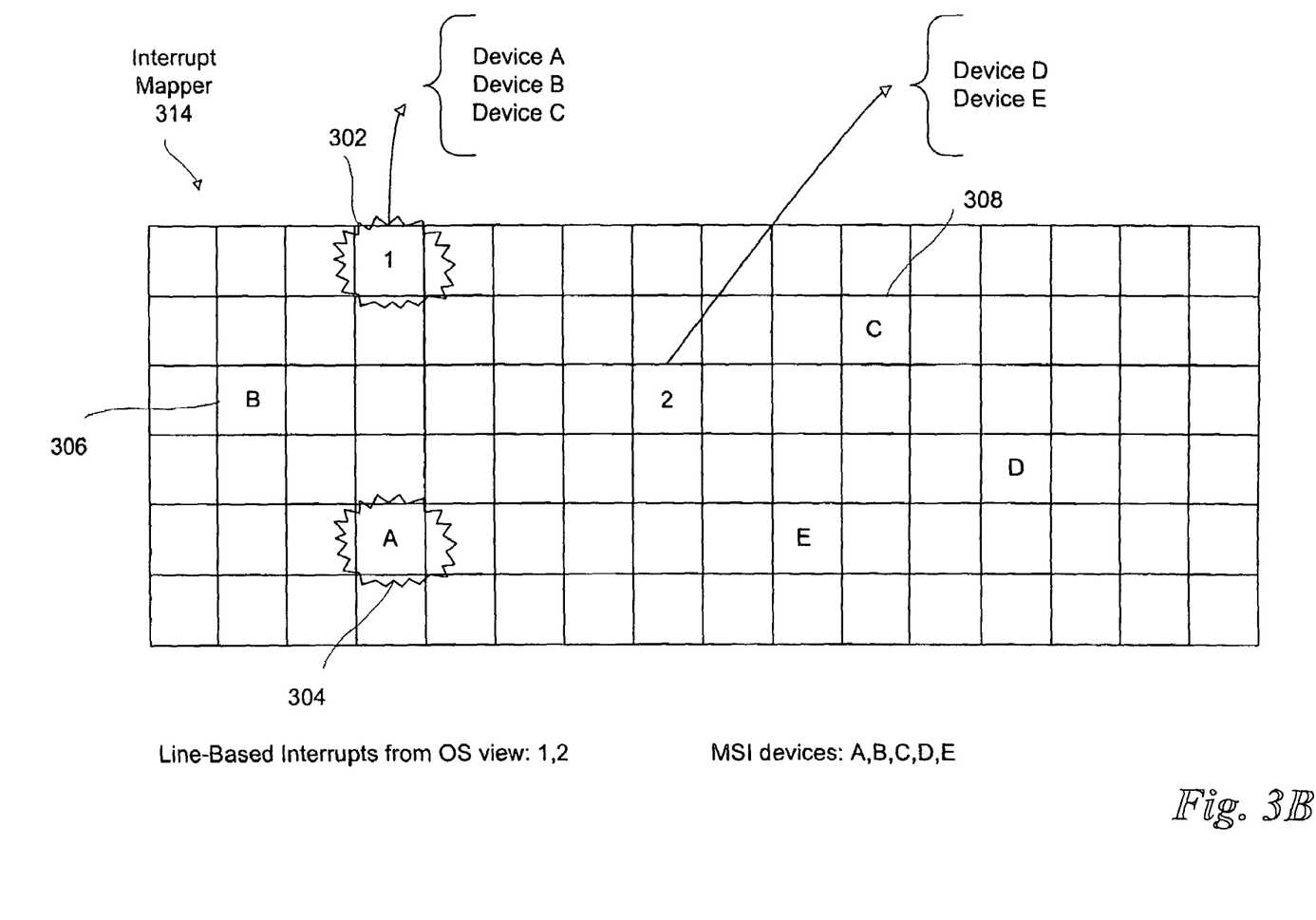
FIG. 3B is a block diagram illustrating one embodiment of an interrupt mapper in accordance with the teachings of the present invention.

Referring to FIG. 3B, an embodiment of determining the corresponding line-based interrupt is shown. In FIG. 3B, the VMM examines the intercepted MSI and determines that the MSI is from device A, as shown at 304. The VMM also knows that from the OS view, device A is assigned to line-based interrupt 1, as shown at 302.

Continuing to a block 216 of FIG. 2, the VMM issues a fake line-based interrupt to the OS. In a true line-based interrupt, the processor will receive an interrupt signal from an interrupt controller. The OS has service routines that catch the processor interrupt. After the service routine has been tripped, the OS proceeds to query devices sharing an interrupt line. In one embodiment, these OS service routines include interrupt service routines (ISRs). In block 216, the VMM triggers an OS service routine by sending a fake line-based interrupt to the OS. Thus, the non-MSI OS may continue to operate as if it is on a line-based interrupt system. It will be understood that the VMM is not using an actual interrupt line to the processor, but the VMM is tripping an OS service routine above the hardware layer.

The logic continues to a block 218, where the VMM services queries from the device drivers of the OS having devices sharing the fake line-based interrupt. In line-based interrupt systems where an interrupt line is shared, the OS must probe each device on the interrupt line to determine which device actually sent the interrupt. This probing involves I/O operations that delay the system. Each hardware device access may take several microseconds.

Also, a device driver may access a single device numerous times to determine if that was the device that interrupted. For example, in the case of a level-triggered interrupt, the device driver may access the device a first time to determine if the device is actually interrupting and access the device a second time to tell the device to stop interrupting.

In block 218, the VMM responds to device drivers probing, but the probing does not involve I/O operations that extend interrupt latency. Referring to FIG. 1, non-MSI OS 108 believes devices 116 and 118 are sharing the same line-based interrupt. The OS queries devices 116 and 118 to determine which device actually issued the interrupt. In reality, VMM 104 responds to these queries to satisfy the OS, even though VMM 104 already knows which device issued the interrupt. The VMM uses the cached configuration information from cache 117 to respond to the queries by the OS. Thus, the OS is not aware that the system is not truly using line-base interrupts. Since these queries are between the OS and the VMM, time expensive I/O accesses are not needed. In one embodiment, OS 108 uses device drivers 112 to query the devices 116 and 118.

Continuing to a block 220, the interrupt vector for the MSI is provided to the OS for execution. In one embodiment, the interrupt vector from the interrupt mapper 114 is passed to the OS. The interrupt vector points to a memory address containing the start point of the appropriate interrupt handler. After block 220, the logic returns to decision block 210 to determine if another MSI interrupt has been sent.

Figure 3C:
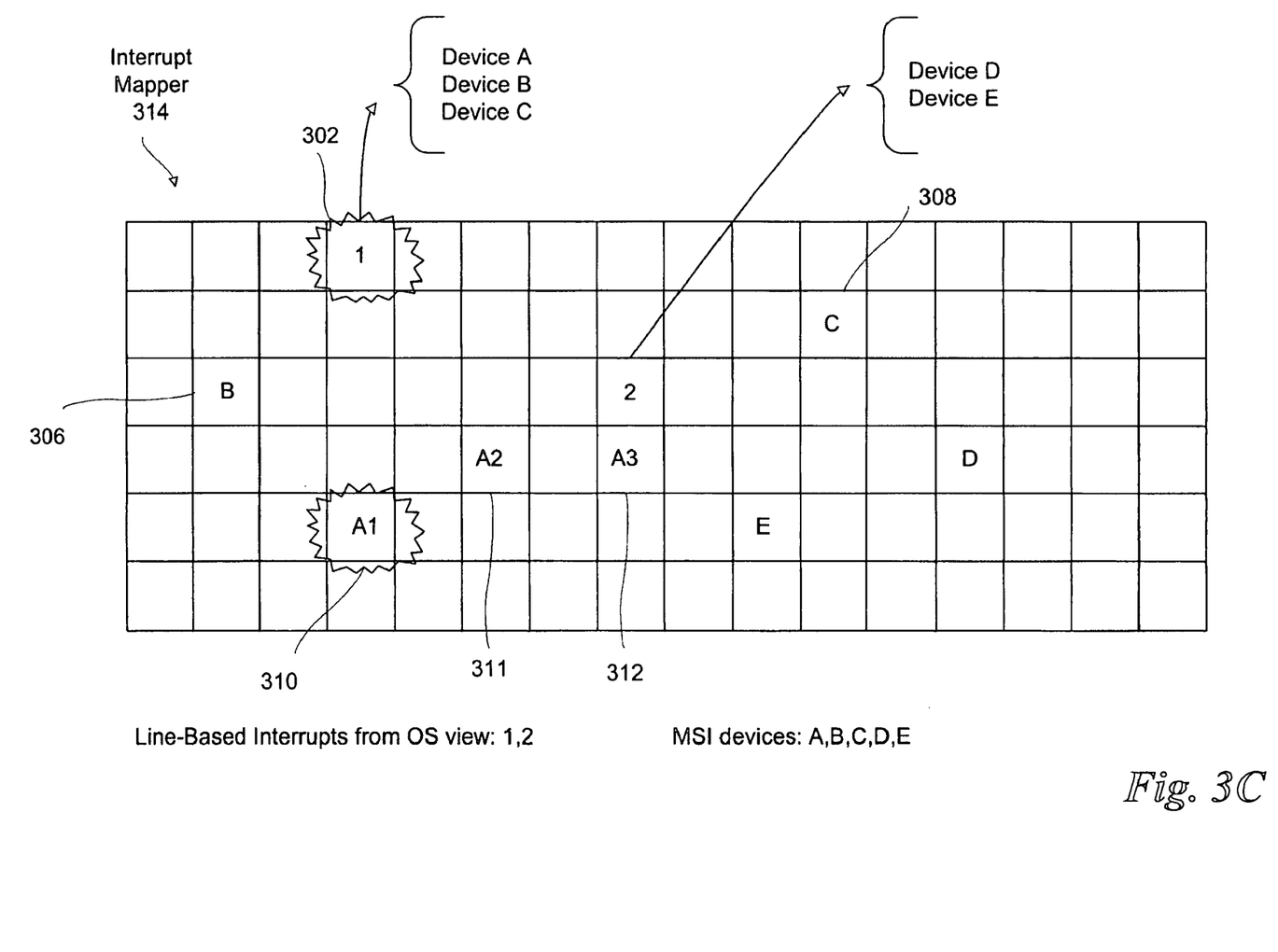
FIG. 3C is a block diagram illustrating one embodiment of an interrupt mapper in accordance with the teachings of the present invention.

Embodiments of the present invention allow MSI devices to utilize the capabilities of MSI even though the OS is not MSI capable. As discussed above, a device may specify a type of interrupt in the MSI payload. Using the interrupt mapper, the VMM can determine which interrupt handler has been triggered by the MSI device. Referring to FIG. 3C, MSI device A may use MSI to specify interrupt vector A1 shown at 310, A2 shown at 311, and A3 shown at 312. The VMM will signal to the non-MSI OS that device A has sent an interrupt, but because of MSI, the VMM already knows the nature of device A's interrupt. The VMM will respond to device drivers who believe interrupt 1 is being shared, and then pass the appropriate interrupt vector to the OS.

Embodiments describe herein prevent sharing of interrupts on a computer system. The sharing of line-based interrupts entails each device driver polling its particular I/O device to query if the device generated the interrupt. An I/O operation to query a device may entail a flush of the chipset posted read/write buffers because the I/O operation is serializing; thus, each I/O operation requires operations in memory to be flushed. Also, the paucity of unique line-based interrupts entails many devices to be wire-OR'd onto a single interrupt circuit line.

Embodiments herein also avoid hanging a machine due to an interrupt storm. Level-triggered interrupts signal an interrupt by holding a certain level. For example, in PCI devices, the device will ground an interrupt pin. The device will maintain this interrupt level until the interrupt is acknowledged and the device is told to stop the interrupt. If the interrupt is not acknowledged properly or other system settings are incorrect, the device will continue to assert the interrupt causing the OS to repeatedly try to acknowledge the interrupt. This failure of a level-triggered interrupt to release an interrupt request (IRQ) is referred to as an interrupt storm. Embodiments herein are not actually using line-based interrupts, so such a scenario may be avoided.

Further, embodiments herein allow users to utilize the benefits of MSI devices and chipsets, even though the OS may not be MSI capable. While OS developers may offer OS's that are MSI capable in the future (e.g., Microsoft Windows® version codenamed "Longhorn"), such operating systems may not be available or fully deployed for several years. Embodiments described herein allow independent hardware vendors to continue to develop MSI capable devices without having to wait for OS developers. Platforms can be shipped with MSI capabilities and those MSI capabilities may be exploited regardless of the abilities of the OS.

Figure 4:
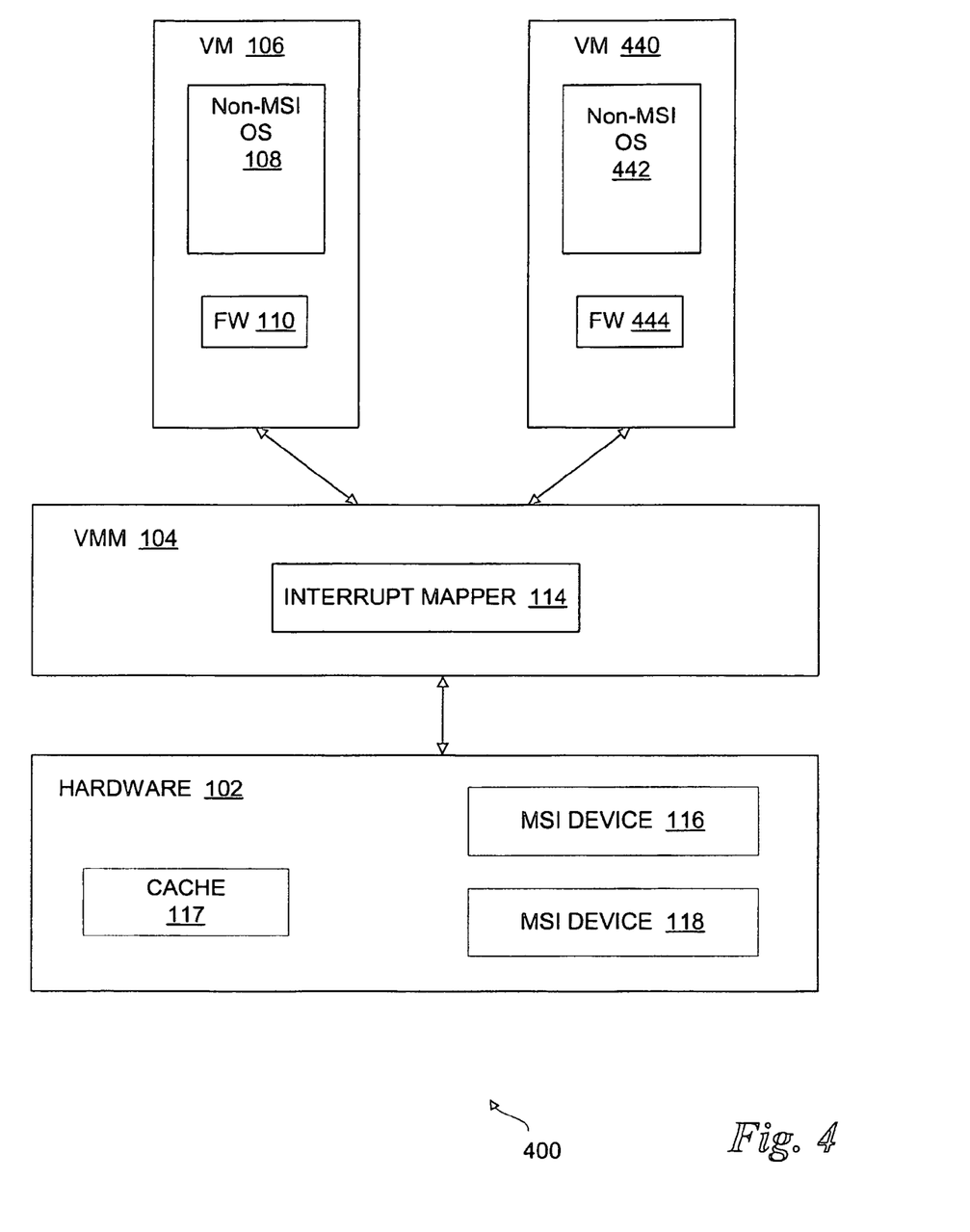
FIG. 4 is a block diagram illustrating one embodiment of a computer system in accordance with the teachings of the present invention.

FIG. 4 illustrates a computer system 400 in accordance with one embodiment of the present invention. Computer system 400 includes like components as computer system 100 in FIG. 1. Computer system 400 also includes a VM 440. VM 440 includes Non-MSI OS 442 and firmware 444. VMM 104 manages the division and sharing of devices between VM 106 and VM 440.

In one embodiment, devices of computer system 400 may be allocated to specific VMs. For example, MSI device 116 may be allocated only to VM 106, while MSI device 118 is allocated only to VM 440. Interrupt mapper 114 would reflect this division of devices and the VMM 104 would react accordingly. For example, if VMM 104 intercepted an MSI from device 116, VMM 104 knows only VM 106 can "see" device 116. VMM 104 would send a "fake" line-based interrupt to Non-MSI OS 108 as described above.

In another embodiment, VMs 106 and 440 may share a device of computer system 400. In one embodiment, a device model is used to share a single device between multiple VMs. Device models are well known in the art. For example, assume MSI device 116 is a block device, such as a disk drive. Half of device 116 is allocated to VM 106 while the other half of device 116 is allocated to VM 440. By using the device model and analyzing the MSI, VMM 104 can track which VM is to receive an MSI intercepted from device 116. VMM 104, using interrupt mapper 114 as described above, will provide a "fake" line-based interrupt to the appropriate OS.

Figure 5A:
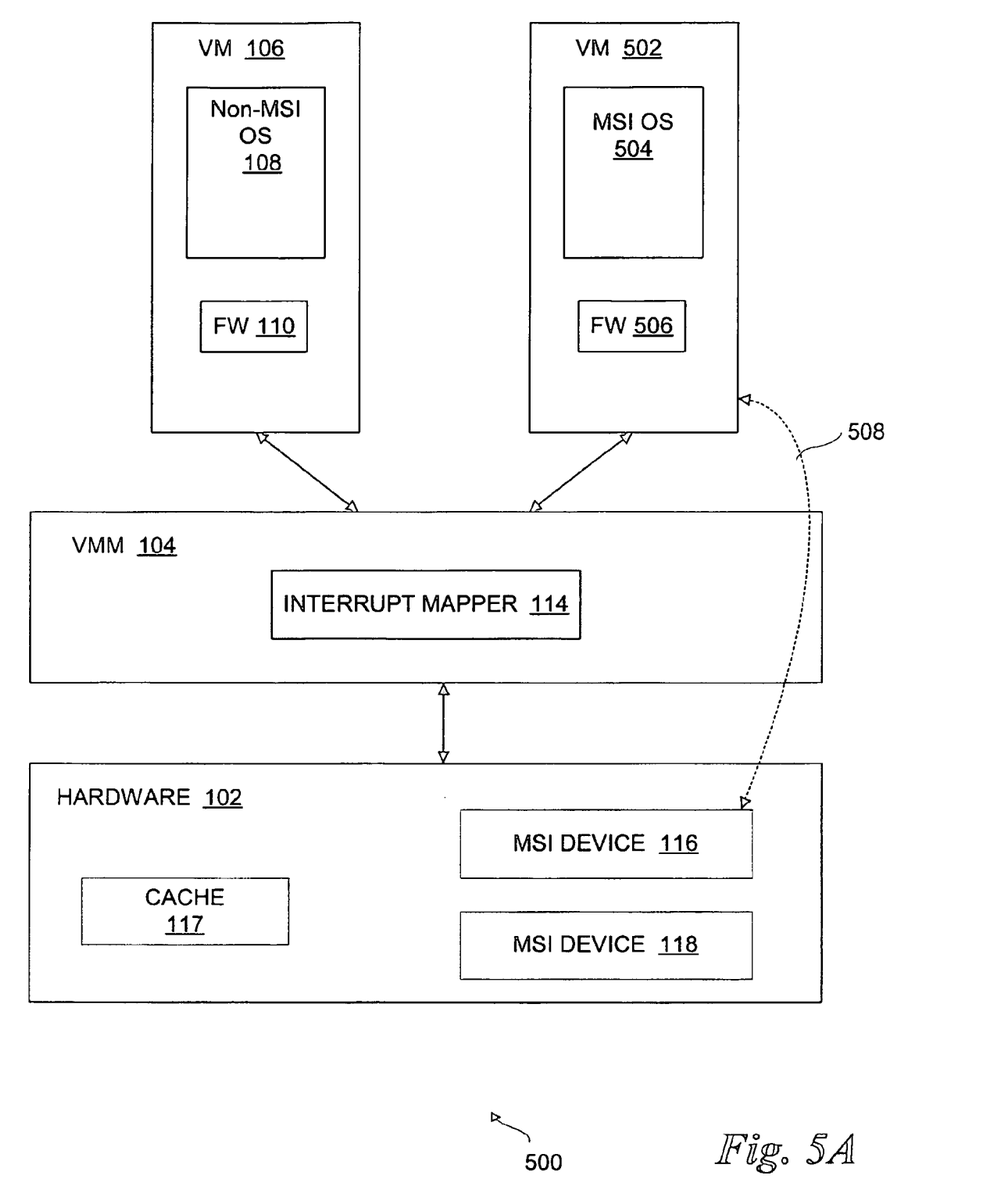
FIG. 5A is a block diagram illustrating one embodiment of a computer system in accordance with the teachings of the present invention.

Turning to FIG. 5A, a computer system 500 in accordance with one embodiment of the present invention is shown. Computer system 500 includes like components as computer system 100 in FIG. 1. Computer system 500 also includes VM 502. VM 502 includes MSI-capable OS 504 and firmware 506.

In computer system 500, MSIs 508 from MSI device 116 are not intercepted by VMM 104 to be analyzed with the interrupt mapper 114. MSIs 508 may be utilized by MSI OS 504 as per normal MSI operations. It will be understood that if MSI device 116 is being shared by more than one VM using a device model, then MSIs 508 may go through interrupt mapper 114 so that VMM 104 can determine which VM the MSIs are intended for.

Figure 5B:
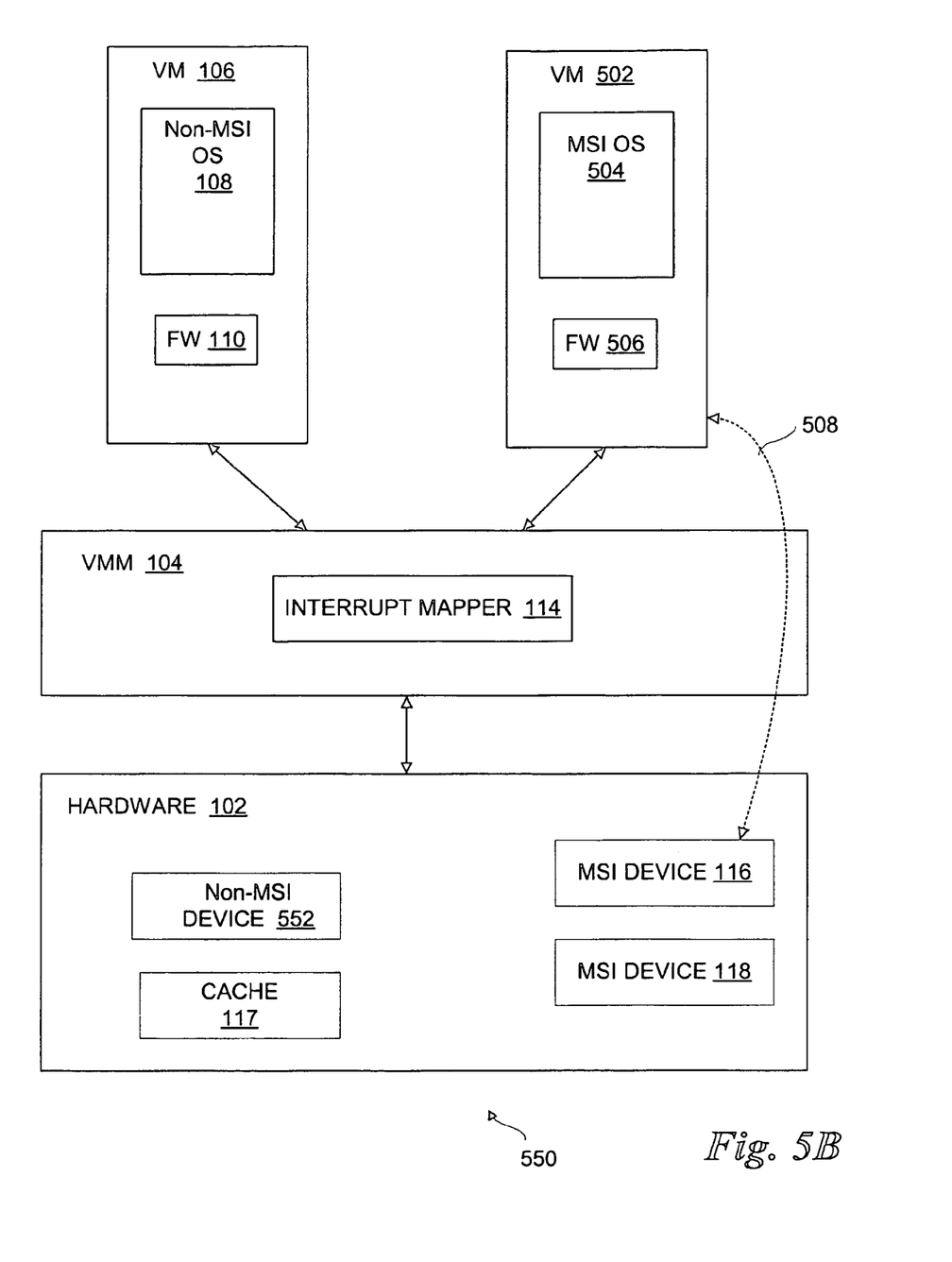
FIG. 5B is a block diagram illustrating one embodiment of a computer system in accordance with the teachings of the present invention.

FIG. 5B illustrates a computer system 550 in accordance with one embodiment of the present invention. Computer system 550 includes like components as computer system 500 in FIG. 5A. Computer system 550 also includes a non-MSI device 552.

Non-MSI device 552 may use traditional line-based interrupts. Usually, line-based interrupts have their destination described by legacy interrupt routing tables created by the BIOS/platform firmware. The VMM will interpret these tables and deliver the interrupt to the "legacy BIOS" guest for which the interrupting device is intended. Since the non-MSI device 552 is not using MSI, device drivers will have to query their respective devices sharing an interrupt line using traditional methods that involve I/O operations.

In computer system 550, VMM 104 manages interrupts from MSI capable and non-MSI capable devices. These interrupts may be intended for MSI capable OS's as well as non-MSI capable OS's. In one embodiment, MSIs 508 from MSI device 116 may be sent to an MSI-capable OS without passing through interrupt mapper 114.

It will be understood that embodiments of the present invention utilizing multiple VMs are not limited to the embodiments of FIGS. 4, 5A, and 5B. Other embodiments may include more VMs having MSI or Non-MSI OS's. Further, other embodiments may include multiple MSI-capable devices as well as multiple non-MSI capable devices.

Figure 6:
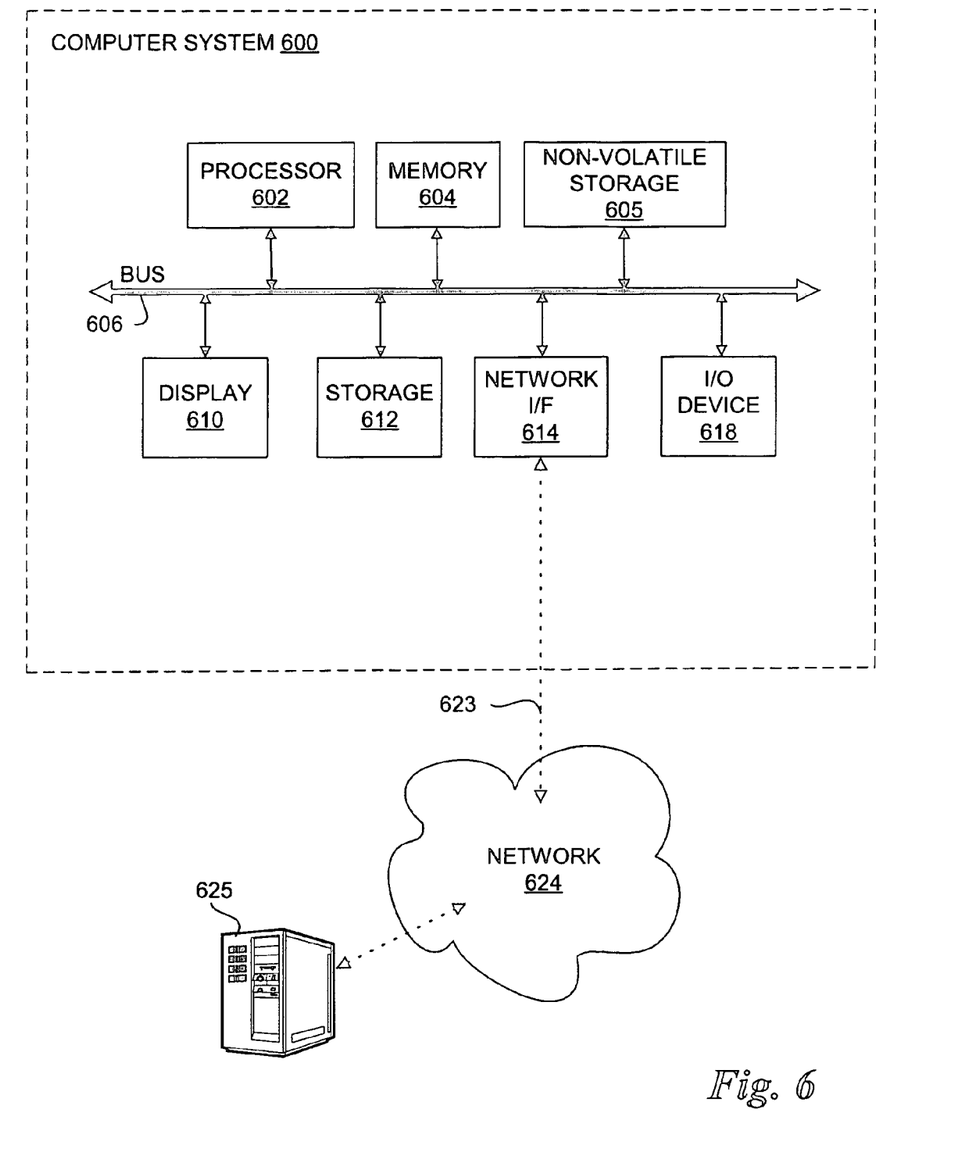
FIG. 6 is a block diagram illustrating one embodiment of an exemplary computer system to implement embodiments of the present invention.

FIG. 6 is an illustration of one embodiment of an example computer system 600 on which embodiments of the present invention may be implemented. Computer system 600 includes a processor 602 coupled to a bus 606. Memory 604, storage 612, non-volatile storage 605, display 610, input/output device 618 and network interface 614 are also coupled to bus 606. Embodiments of computer system 600 include, but are not limited to, a server, a desktop computer, a notebook computer, a personal digital assistant, a network workstation, or the like. A typical computer system will usually include at least processor 602, memory 604, and bus 606 coupling memory 604 to processor 602.

The computer system 600 may interface to external systems through the network interface 614. Network interface 614 may include, but is not limited to, a modem, a network interface card (NIC), or other interfaces for coupling a computer system to other computer systems. A carrier wave signal 623 is received/transmitted by network interface 614. In the embodiment illustrated in FIG. 6, carrier wave signal 623 is used to interface computer system 600 with a network 624, such as a local area network (LAN), a wide area network (WAN), or the Internet. In one embodiment, network 624 is further coupled to a remote computer 625 such that computer system 600 and the remote computer 625 may communicate over network 624.

Processor 602 may include, but is not limited to, an Intel Corporation x86, Pentium®, Xeon®, or Itanium® family processor, a Motorola family processor, or the like. In one embodiment, computer system 600 may include multiple processors. Memory 604 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Display 610 may include a cathode ray tube (CRT), a liquid crystal display (LCD), an active matrix display, or the like. Input/output device 618 may include a keyboard, a mouse, a printer, a scanner, a speaker system, or the like.

The computer system 600 also includes non-volatile storage 605 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), or the like. Storage 612 includes, but is not limited to, a magnetic disk, a magnetic tape, an optical disk, or the like. It is appreciated that instructions executable by processor 602 may reside in storage 612, memory 604, non-volatile storage 605, or may be transmitted or received via network interface 614.

For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., a read only memory (ROM), a random access memory (RAM), a magnetic disk storage media, an optical storage media, a flash memory device, etc.). In addition, a machine-accessible medium can include propagated signals such as electrical, optical, acoustical or other form of propagated signals (e.g., carrier waves, infrared signals, digital signals, etc.).

It will be appreciated that in one embodiment, computer system 600 may execute operating system software. For example, one embodiment of the present invention utilizes Microsoft Windows® as the operating system for computer system 600. Other operating systems that may also be used with computer system 600 include, but are not limited to, the Apple Macintosh operating system, the Linux operating system, the Unix operating system, the Microsoft Windows CE® operating system, or the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to embodiments of the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method, comprising:
    intercepting a message-based interrupt from a device of a computer system;
    determining a fake line-based interrupt for the device corresponding to the message-based interrupt, wherein an operating system (OS) of the computer system is not message-based interrupt capable;
    issuing the fake line-based interrupt to the OS;
    servicing a query from the OS regarding the fake line-based interrupt, the query to determine if the fake line-based interrupt was from the device; and
    providing an interrupt vector associated with the message-based interrupt to the OS.

2. The method of claim 1 wherein the message-based interrupt includes a message-signaled interrupt (MSI).

3. The method of claim 1 wherein servicing the query comprises:
    receiving the query from a device driver associated with the device; and
    providing device configuration information to the device driver.

4. The method of claim 1, further comprising servicing a second query from the OS, wherein the OS believes the fake line-based interrupt is shared by the device and a second device of the computer system.

5. The method of claim 1, further comprising storing device configuration information associated with the device.

6. The method of claim 1, further comprising initializing an interrupt mapper, wherein the interrupt mapper maps the message-based interrupt to the fake line-based interrupt.

7. The method of claim 6, further comprising launching a VMM to manage the interrupt mapper, wherein the OS executes in a VM supported by the VMM.

8. The method of claim 7 wherein the VMM operates substantially in accordance with an Extensible Firmware Interface (EFI) specification.

9. The method of claim 7, further comprising launching a second OS in a second VM supported by the VMM, wherein the second OS is not message-based interrupt capable.

10. The method of claim 9 wherein the interrupt mapper maps a second fake line-based interrupt with a second device available to the second OS.

11. The method of claim 9 wherein the OS and the second OS share the device, the VMM to issue the fake line-based interrupt to the OS or the second OS based on analysis of the message-based interrupt.

12. The method of claim 1, further comprising launching a second OS in a second VM supported by the VMM, wherein the second OS is message-based interrupt capable.

13. The method of claim 12 wherein the second OS receives a second message-based interrupt from the device without the second message-based interrupt being intercepted by the VMM.

14. An article of manufacture, comprising:
a machine-accessible medium including a plurality of instructions which when executed perform operations comprising:
intercepting a message-signaled interrupt (MSI) from an MSI device of a computer system;
determining a fake line-based interrupt for the MSI device corresponding to the MSI;
tripping an operating system (OS) service routine of a non-MSI OS of the computer system, the OS service routine corresponding to the fake line-based interrupt;
servicing a query from the non-MSI OS regarding the fake line-based interrupt; and
providing an interrupt vector associated with the message-based interrupt to the OS.

15. The article of manufacture of claim 14 wherein servicing the query comprises:
receiving the query from a device driver associated with the device, wherein the query to determine if the fake line-based interrupt was from the device; and
providing device configuration information to the device driver.

16. The article of manufacture of claim 14 wherein execution of the plurality of instructions further perform operations comprising initializing an interrupt mapper, wherein the interrupt mapper to map the message-based interrupt to the fake line-based interrupt.

17. The article of manufacture of claim 16 wherein execution of the plurality of instructions further perform operations comprising launching a VMM to manage the interrupt mapper, wherein the non-MSI capable OS to execute in a VM supported by the VMM.

18. The article of manufacture of claim 14 wherein execution of the plurality of instructions further perform operations comprising servicing a second query from the non-MSI OS, wherein the non-MSI OS believes the fake line-based interrupt is shared by the device and a second device of the computer system.

19. The article of manufacture of claim 14 wherein the plurality of instructions to operate substantially in compliance with an Extensible Firmware Interface (EFI) specification.

20. A computer system, comprising:
a processor; and
at least one flash memory device operatively coupled to the processor, the at least one flash memory device including firmware instructions which when executed by the processor perform operations comprising:
intercepting a message-based interrupt from a device of a computer system;
determining a fake line-based interrupt for the device corresponding to the message-based interrupt, wherein an operating system (OS) of the computer system is not message-based interrupt capable;
issuing the fake line-based interrupt to the OS;
servicing a query from the OS regarding the fake line-based interrupt, the query to determine if the fake line-based interrupt was from the device; and
providing an interrupt vector associated with the message-based interrupt to the OS.

21. The computer system claim 20 wherein servicing the query comprises:
receiving the query from a device driver associated with the device; and
providing device configuration information to the device driver.

22. The computer system of claim 20 wherein execution of the firmware instructions further perform operations comprising initializing an interrupt mapper, wherein the interrupt mapper maps the message-based interrupt to the fake line-based interrupt.

23. The computer system of claim 22 wherein execution of the firmware instructions further perform operations comprising launching a VMM to manage the interrupt mapper, wherein the non-MSI capable OS to execute in a VM supported by the VMM.

24. The computer system of claim 20 wherein execution of the plurality of instructions further perform operations comprising servicing a second query from the non-MSI capable OS, wherein the non-MSI capable OS believes the fake line-based interrupt is shared by the device and a second device of the computer system.

25. A system, comprising:
a first message-signaled interrupt (MSI) device;
a second MSI device;
a virtual machine (VM) including a non-MSI operating system (OS); and
a virtual machine monitor (VMM) supporting the VM, the VMM including an interrupt mapper to map a first MSI from the first MSI device and a second MSI from the second MSI device to a fake line-based interrupt for the non-MSI OS.

26. The system of claim 25, further comprising a non-MSI device driver operatively coupled to the non-MSI OS, the non-MSI device driver to query the first MSI device in response to the fake lined-based interrupt issued by the VMM.

27. The system of claim 25, further comprising a cache operatively coupled to the VMM, the cache to store configuration information associated with the first MSI device.

28. The system of claim 25 wherein the VMM to operate substantially in compliance with an Extensible Firmware Interface (EFI) specification.

* * * * *